July 19, 1960
E. F. PETERSON
2,945,386
MAGNETICALLY IMPELLED BALL VIBRATOR
Filed March 10, 1958
3 Sheets-Sheet 1
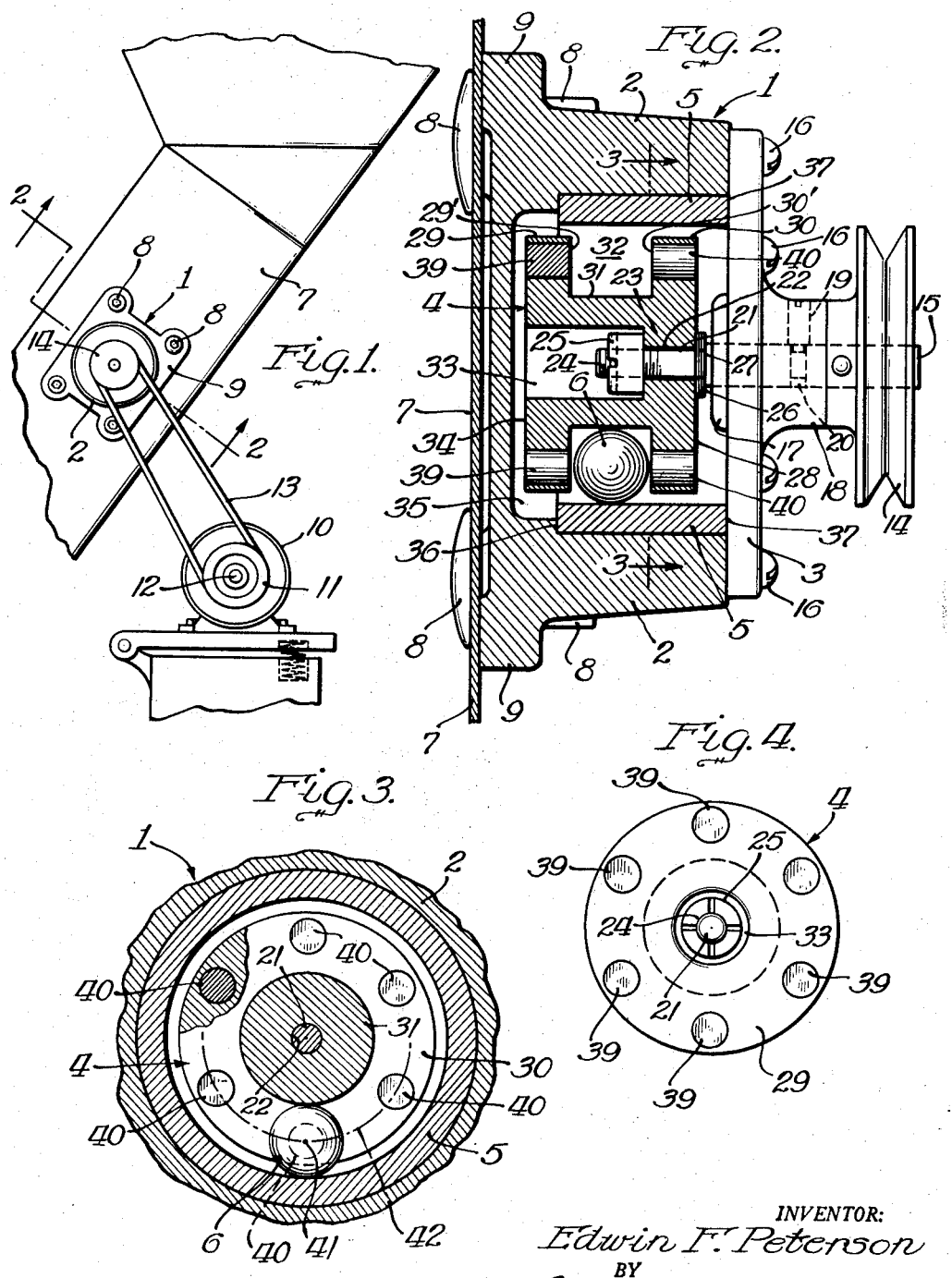
INVENTOR:
Edwin F. Peterson
BY
Eberhard E. Welty
Atty.

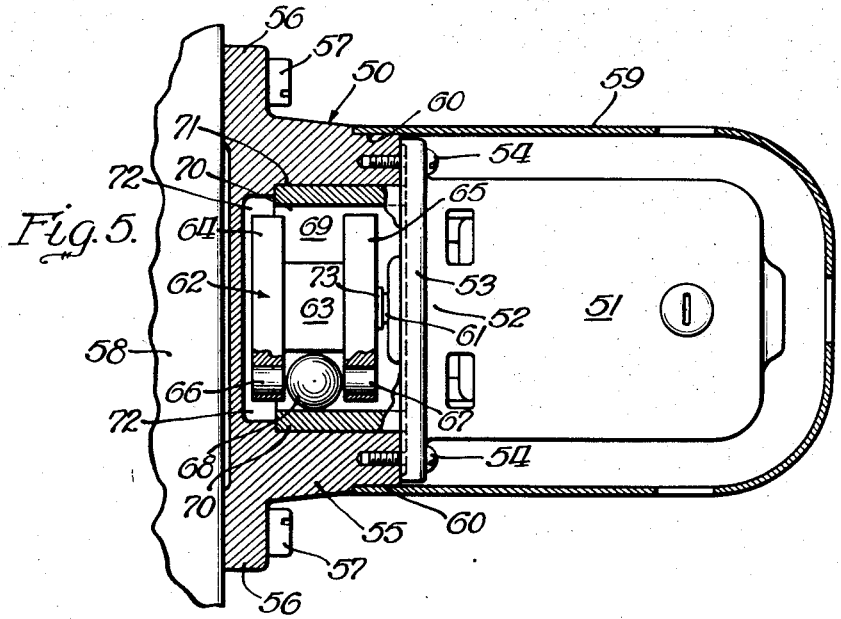
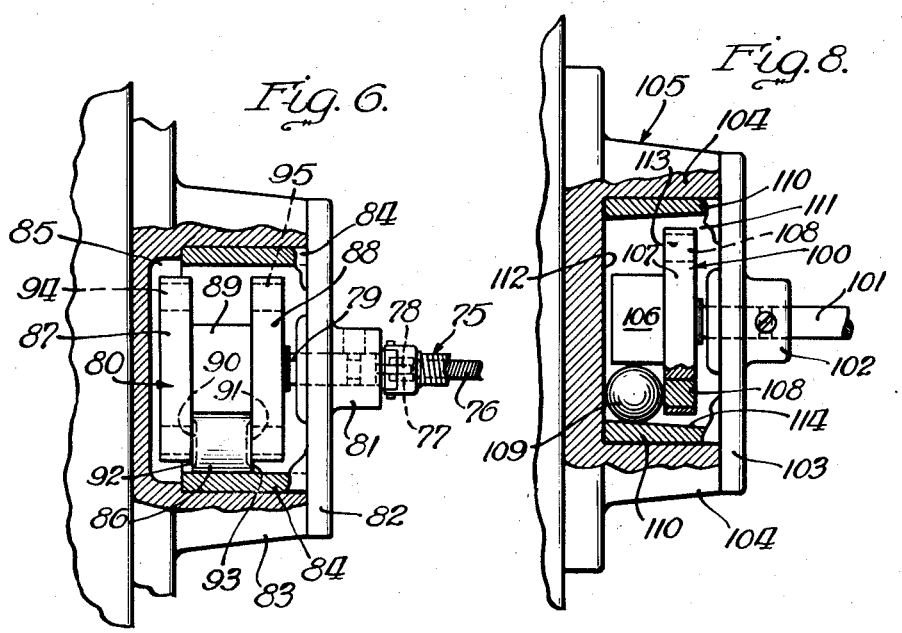
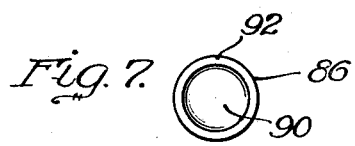

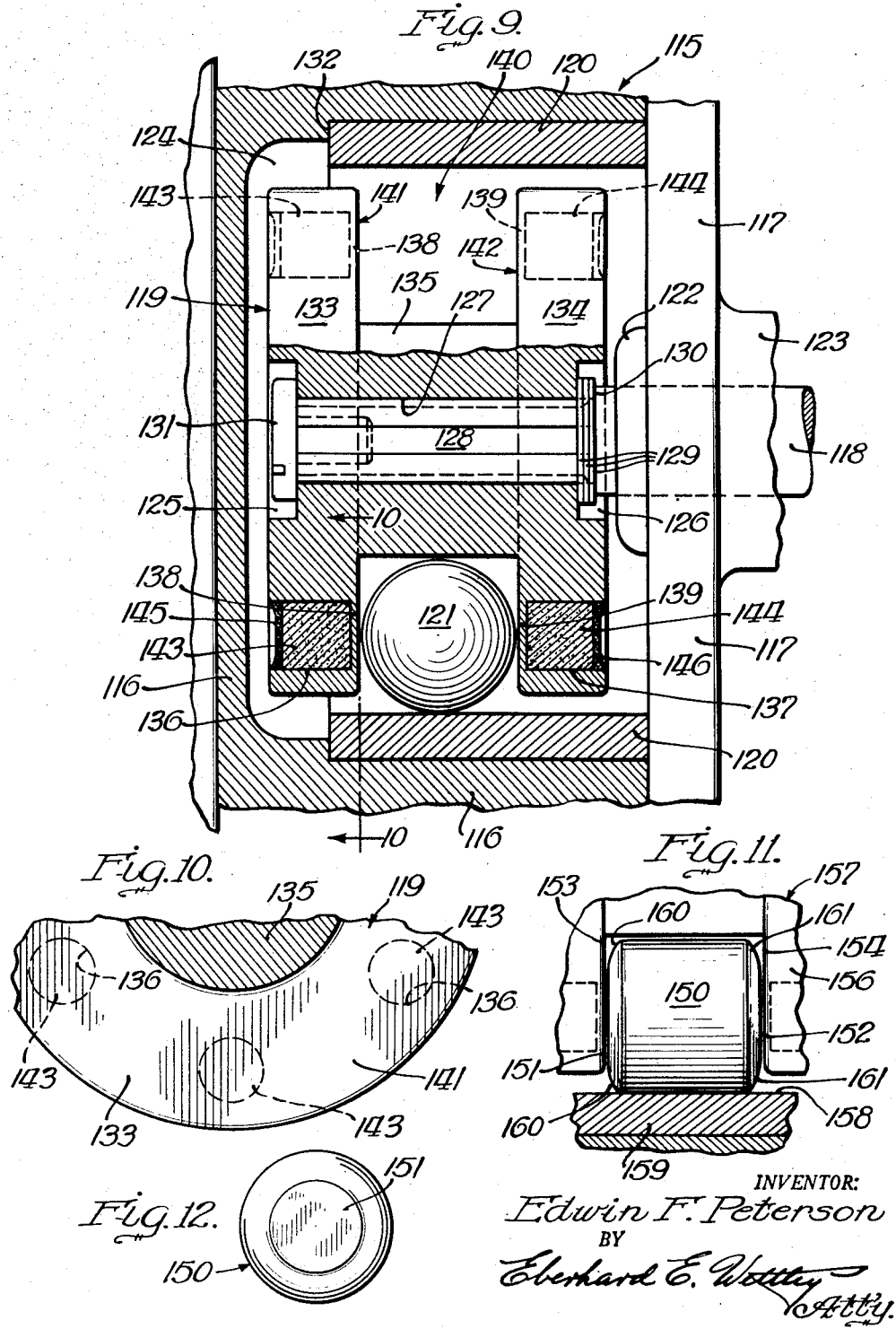

United States Patent Office 2,945,386
Patented July 19, 1960

2,945,386
MAGNETICALLY IMPELLED BALL VIBRATOR
Edwin F. Peterson, P.O. Box 151, Neponset, Ill.
Filed Mar. 10, 1958, Ser. No. 720,222
16 Claims. (Cl. 74—87)

This invention relates to a vibratory device of the character that is adapted for securement to a surface portion of any type of an industrial unit whose operation is enhanced through the transmission of vibrations to such unit.

Ducts or dispensing devices that are used to convey materials of various consistencies or of uniform or mixed particle sizes and/or granular texture all provide one selected field of application for such a vibratory device. The foundry field in mold and in core making would provide another field for the use of such vibrators. These are only some examples of the widespread possible use and application of a device or mechanism of this invention.

More specifically, the present invention is directed to a magnetically impelled ball vibrator. This vibrator in general consists of a compact mechanism housing a rotationally driven free weight member guided along a predetermined orbital or rotary path and in offset relation to the center of weight of such mechanism to produce unbalanced forces in said mechanism setting up the vibrational action. Such vibrations are directly transmitted to an object to which the mechanism is attached.

One of the main problems encountered in devices of this character pertains to the wear and tear due to heat and friction. Some constructions are made to provide means for air propulsion to actuate a ball or like weight member about its guideway within a housing. But air under pressure is not always available and then only in very limited locations. Some shops have an air supply that is used for many shop purposes and would be available for driving an air propelled vibrator. But to establish and maintain such equipment merely to drive such vibrators is costly and unfeasible in general.

In foundries and other analogous shops it is important that all pressurized air be filtered and kept clean to be free of dust and sand particles if such air is to be used in air driven vibrators. If the air is not kept clean the frictional wear and impact deterioration would again cause too much trouble in vibrator mechanisms of these constructions and characteristics.

Many other kinds of vibrators have been developed using more positive drive methods to impel a free object about a continuous closed guideway or path in a housing. In the latter some form of arm or other contact member is used to bodily push the ball or other object in its prescribed path. But the friction factor is here again found to cause inefficiency plus wear and tear with too much service, replacements and all at too much expense. This lack of dependability and insecure performance in devices of this character has proven highly objectionable.

It is one of the main objects of the present invention to provide a dependable and efficient vibratory device that eliminates all of the objectionable characteristics above referred to and which provides a device of universally functional possibilities to greatly expand the field of use of the vibrator and under long trouble free service conditions.

Another object of the vibratory device is to introduce a magnetically induced friction free drive for a magnetically attractable weight member which comparatively follows the positive drive pattern or operation of other vibrators, but without resorting to excessive or induced part to part contact of the character that would create and produce excessive friction and part wear.

A further object of this invention is to provide a friction free ball vibrator using a very compact construction and employing only two moving parts in the vibrator per se, namely, the impeller and the weight member or ball.

Another object is to provide a vibrator wherein only one hardened wear element is employed to take the entire thrust and travel of the moving element. In this connection certain constructional details are incorporated to shift the wear paths or contact tracks so to speak between the moving element and the reactionary hardened wear element to thus greatly extend the use and the life of such a wear element.

As a further object, the vibrator is constructed to provide an impelling unit therein that not only drives or actuates the free weight member, but to so construct this impelling unit as to also form a guiding means to hold the free weight member in a given orbital plane of operation. Thus the free moving weight member is constantly maintained in operation in a predetermined plane to disperse the off-center centrifugal forces radially in this same plane of action.

This latter arrangement provides a further advantage in being able to use a reactionary hardened ring of true cylindrical contour radially inwardly and outwardly to form the reactionary rolling path for the free weight member. With the combination of the impelling unit to guide the free weight member and the hardened ring to coact with the impelling unit, a perfect guideway is established to hold the free weight member in a predetermined plane of operation whereby to orient this plane in a given relation to another object to which the vibrator is secured for vibrational transmission to such object.

As another object, the impelling or actuating unit is provided with magnetic elements to create the magnetic attraction or pull that acts upon the free magnetically attractable weight member to spin or drive the latter about its guided path of operation and in the plane established by such impelling unit as previously explained.

Other objects and advantages relating to the magnetically impelled ball vibrator of the present invention shall hereinafter appear in or become apparent from the following detailed description having reference to the several forms of the invention that are disclosed in the accompanying drawings which form a part of this specification.

In the drawings:

Fig. 1 is a general side elevational view of one installation of a magnetically impelled ball vibrator as it would appear when secured to a material feed duct of a conveyor system and as it may be driven through a suitable belt means from an electrical motor;

Fig. 2 is an axial cross sectional view through the vibrator substantially as it would appear when viewed along the plane of the line 2—2 in Fig. 1;

Fig. 3 is a fragmentary vertical cross sectional view of the vibrator taken on a radial plane substantially as indicated by the line 3—3 in Fig. 2;

Fig. 4 is an end view of the magnetic propulsion unit or spool for the free movable weight element of the vibrator and as it appears when viewed from the left side in Fig. 2;

2,945,386

Fig. 5 is a side elevational view of a modified vibrator construction shown partially broken away and in section;

Fig. 6 is another modified construction of the vibrator of this invention with parts thereof shown in section to better illustrate certain details of the construction thereof;

Fig. 7 is an end view of the free weight member per se that is employed in Fig. 6 and which in this case is in the form of a cylindrical roller; and Fig. 8 is a further modified embodiment of the vibrator of this invention incorporating certain other variations in the construction thereof and which are readily made possible by the particular action and operation of the moving parts of this device.

Fig. 9 is an axial cross sectional view of a further modified construction of a magnetically impelled ball vibrator that illustrates the use of a spool rotor designed to advantageously provide certain frictional efficiencies that further contribute to the smooth functioning of the vibrator of this character and whereby other inherent advantages are possible that relate to the use of various types of magnetic members under long life operational conditions;

Fig. 10 is a cross sectional view of a fragmentary part of the spool rotor per se as the same appears when viewed along the plane of the line 10—10 in Fig. 9;

Fig. 11 is a sectional view of a fragmentary portion of the vibrator that is illustrated in Fig. 9, with the rotor shown in elevation, and wherein a roller has been substituted in place of the ball in Fig. 9 thus introducing a heavier rolling element for operation in a vibrator which may be readily converted to increase or decrease the intensity of the vibratory action within certain limits of operation; and Fig. 12 is an end view of the rolling element shown in Fig. 11 to better illustrate certain constructional features of this roller that contribute to the efficient and proper functioning of the vibrator under high speed operative conditions.

Referring now to Figs. 1 to 4, the vibratory mechanism is indicated in its entirety as the vibrator 1, and comprises, in general, a housing 2, a cover 3 for the housing, a rotary unit 4, a raceway or liner 5 for the housing 2 and a free movable weight member 6.

The vibratory mechanism 1 has many applications and as shown in Fig. 1, housing 2 is suitably secured to a material conveying duct 7 by means of a plurality of fastening nut and screw assemblies 8 carried by a base 9 on housing 2, such assemblies functioning through appropriate openings in the wall of duct 7. Any suitable power means may be used to operate the vibratory mechanism 1. In Fig. 1, a motor 10 is arranged to drive the pulley 11 secured to the motor shaft 12 and power is transmitted through a belt 13 to a drive pulley 14 suitably keyed to the drive shaft 15 of the vibratory mechanism 1 as best illustrated in Figs. 1 and 2.

As seen in Fig. 2, the vibratory mechanism or vibrator 1 provides simple and effective means to orient the drive shaft 15 in a given relation to the housing 2, cover 3 and to the entire assembly. Cover 3 is releasably secured to housing 2 by appropriate screws 16 and hub sections 17 and 18 on the cover carry and provide the journal for shaft 15. Thus shaft 15 is positioned and oriented in the central portion of housing 2. Additionally, shaft 15 is axially oriented and secured against endwise shifting or displacement by suitable means such as a shouldered screw 19 riding in a slot 20 in shaft 15.

Shaft 15 has a reduced inner end section 21 passing through a bore 22 in the web portion 23 of the rotary unit 4, with the terminal end of section 21 being threaded as at 24 to receive a securing nut 25 to mount the rotary unit in fixed relation upon shaft 15. As shown in Fig. 2, one or more washers 26 may be interposed between the shoulder 27 on shaft 15 and the adjacent face 28 of the rotary unit 4. The removal of one or more washers such as 26 will permit axial repositioning of the rotary unit 4 for purposes to be hereinafter explained.

The rotary unit 4 may best be described as a propulsion spool having spaced rims or flanges 29 and 30 separated by a hub 31, with the rims defining an annular guideway or pathway 32 encircling the hub 31. A central or axial socket 33 is formed in the outer terminal face portion 34 of the propulsion spool to accommodate the securing nut 25 and to permit access to the nut and to the threaded end 24 of shaft 15 for adjustments, servicing or for the removal or interchange of the propulsion spool, the washer 26 or to inspect or replace its parts or for other desirable mechanical changes.

With further reference to Fig. 2, the housing 2 is constructed with an internal cavity 35 having an annular recessed section 36 to receive and retain the raceway or liner 5, the latter being also held in place by the cover 3 which abuts the ring at 37. Ring 5 is preferably constructed of hardened steel material to withstand and counteract the wear to which it is subjected by the free movable weight member 6.

The weight member 6 may be any type of a magnetically attractable unit that lends itself to free and unobstructed rotation within the annular guideway 32. In this connection, the proportions and spacings of the propulsion spool rims and hub, and the respective diametral dimensions of the spool and the ring 5 which is of an annular cylindrical shape, are so provided and devised to create a continuous free channel or pathway wherein the weight member 6 may be bodily actuated in a given plane of operation around the axis of the shaft 15 that impels or drives the rotary unit 4. In the form illustrated in Fig. 2, the magnetically attractable weight member 6 is a hardened polished steel ball that rolls in point contact along an annular line of contact coincident with the interior or radially inward surface of the liner or ring 5 and in a rolling path as established by the guidance of rims 29 and 30 of the propulsion spool.

It should be emphasized that the opposing faces 29' and 30' of the rims 29 and 30, which flank the guideway 32, are coincident with planes radially traversing the shaft 15 or its axis so as to establish coacting spaced guide walls that flank the sides of the weight member or ball 6 for only point contact with the surface of the ball per se and to thereby eliminate all frictional interference with the free motion of the ball or with its confined but centrifugal actuation about the liner or ring 5 as the reactionary contact means that is backed up by the housing 2. Under operation, the ball 6 is held radially outwardly against the hollow interior of ring 5 and none of the centrifugal stresses or forces created by the ball in its high speed annular travel while in off-center relation to the axis of shaft 15 will be transmitted to the propulsion spool or rotary drive unit 4.

Magnetic means are provided to furnish the active force means to cause actuation of the weight of ball 6 about its path of operation around the guideway of the propulsion spool. The latter rotary unit 4 is constructed to carry a plurality of magnets 39 and 40 in the rims 29 and 30 respectively. All of the magnets are here shown as cylindrical plugs that snugly and tightly seat in bores formed axially through the thicknesses of rims 29 and 30. The terminal ends of the magnets are flush and coincident with the opposite outer faces 28 and 34 of the propulsion spool 4 and also flush with the annular radial faces 29' and 30' defining the central channel area of the spool surrounding the rim portion of the hub 31.

As best viewed in Figs. 3 and 4, the magnets 39 and 40 are all located at the same radial distances from the axis of the rotary unit 4, and at the same time the circular distances or spacings between the adjacent magnets are the same to provide and create a balanced condition as far as the physical weight distribution of the collective metal parts of the propulsion spool or rotary unit 4 are concerned. The purpose is to provide a completely balanced vibratory mechanism that receives entire vibratory action from an off-center weight member impelled around a given path that is normally or preferably concentric with the axis of the impelling means.

While it is possible to vary the radial location of the magnets within certain operative limits in relation to the axis of rotation of the rotary mechanism, it has been determined that when the respective axes of the magnets are all located on radii that coincide with the axial center of the location of the ball 6, that this situation produces the best driving efficiency for causing the magnets to attract and pull the ball around its course or path of operation within the ring 5 in housing 2. Fig. 3 well illustrates how this desirable relationship may be determined. Ball 6 in Fig. 3 has its fore and aft axis 41 coincident with the axes of the magnets 40. All magnet axes intersect the dot and dash arc 42 that depicts the radially outward spacings of all of the magnets both 39 as well as 40. The path of motion of the ball 6 carries the ball around in the direction of the arc 42 (completed) to follow the pathway defined for the ball about the interior of the housing by the rims 29 and 30 of rotor 4 and the hardened ring 5 of the raceway in housing 2.

For the best efficiency and most effective operation of the device, the rotor 4 is made and constructed from non-magnetic material. The sets of magnets 39 and 40 may be of solid magnetic metallic material or of suitable fabricated powdered magnetic substances. Ball 6 is made of steel to set up a highly magnetically attractive freely moving body. While other magnetically attractive materials might be used for the moving element, steel has proven highly efficient and steel is also extremely wear resistant.

Thus, by a high speed rotation of the propulsion spool or rotor 4, the magnetic means of the rotor function to set the magnetically attractable rolling element in motion and keep said rolling weight element moving at the speed of rotation of the rotor. Rotation in either direction will be equally accomplished and equally as effective as far as the resultant vibratory action is concerned.

The magnetic action which propels or imparts motion to the magnetically attractable rolling element to impel said element about the axis of rotor rotation in the vibratory device resembles the action that prevails in a fluid coupling. The rolling element is brought up to the speed of the rotor under magnetic attraction. When at rotor speed the rolling element is presumed to travel in alignment between an axially disposed pair of aligned magnets that are carried by the rotor. Under certain slight kinetic changes the rolling element may drift or shift to one of the next adjacent axially aligned pairs of magnets. Or perhaps several pairs of magnets might be overrun. In general, the rolling element follows the rotative speed of the rotor in the same way in which the coacting operative rotative elements of a fluid coupling are simultaneously synchronized kinetically through the motion of the fluid. In the vibrator, the magnetic attractive forces move the rolling unit.

Other variations in certain structural details are possible over the form of the invention just described. One such modification is illustrated in Fig. 5 which illustrates the use of a vibrator-motor combination in the form of a single unitary assembly as a compact unit to serve in the same capacity for which the vibratory mechanism of the present invention was devised.

In Fig. 5, the vibrator 50 includes an electric motor 51 having a base portion 52 to provide a cover 53 that is secured by screws 54 to the housing 55. Housing 55 has a base flange 56 which is attachable with suitable fastening means such as screws 57 to an object 58 to which the vibratory motions are to be transmitted from the vibrator 50. A vented or apertured shield 59 is suitably secured to an annular recessed portion 60 of the housing 55 and the shield provides a protective cover for the outer end of the assembly.

The motor shaft 61 carries the propulsion spool 62 of non-magnetic material which, as in the first described form, comprises a hub 63, spaced rims or flanges 64 and 65, with the latter being provided with magnets 66 and 67 respectively, arranged concentrically about the spool axis. The magnets are in line as shown in the broken section of the spool in Fig. 5, and they are also equally spaced from one another circularly about each flange 64 and 65.

A magnetically attractable steel ball 68 is guided for movement in a plane that transversely bisects the channel or guideway 69 surrounding hub 63 between the flanges 64 and 65 of the spool 62. A reactionary metal ring 70 is carried in a recess 71 encircling the interior cavity 72 of the housing 55 and cover 53 serves to releasably hold the ring 70 in fixed position within the housing recess. This embodiment of the invention includes a shaft 61 that is the same as the shaft in Fig. 2 including a washer means 73 on the order of the washer structure 26 in Fig. 2. The other modifications shown in Figs. 6 and 8 also include this same adjustable washer feature for shifting the spools axially to regulate the operational orbit of the rolling weight element as considered in relation to the hardened rings.

In Figs. 6 and 7, a flexible drive means 75 is employed having a drive cable 76 connected at 77 to a spindle 78 forming a part of the drive shaft 79 of the propulsion spool 80. Shaft 79 is journalled in the hub section 81 in cover 82 that seats and mounts upon housing 83 carrying a reactionary ring 84 in the housing cavity 85. The rolling weight in Fig. 6 consists of a roller or cylinder 86 that rides on ring 84 as guided by the spaced rims or flanges 87 and 88 and the hub 89 of the spool 80.

As best illustrated in Fig. 7, the roller or cylinder 86 has cupped or centrally recessed faces or ends 90 and 91 to reduce as much as possible any frictional contact with the adjacent faces of the rims 87 and 88. The actual guiding end surfaces on the roller or cylinder are the annular peripheral side rims 92 and 93. In this form of the invention, magnets 94 and 95 are used to pull and attract the cylinder 86 to impel the latter about the raceway defined by the hub 89, flanges 87 and 88, and the ring 84.

Fig. 8 illustrates another embodiment using a half spool 100 secured to and driven by a shaft 101 journalled in the hub portion 102 of cover 103 fastened to housing 104 of the vibratory unit 105. The spool 100 consists of a hub 106 extending axially away from a rim or flange 107 that carries the magnets 108 in a concentric location with respect to the spool axis, said magnets being equally spaced from one another around their annular locations.

This construction provides a pathway or guideway for a ball 109 which is defined by or outlined by the hub 106 and flange 107 of the spool, a reactionary ring 110 surrounding the cavity 111 in housing 104, and a wall 112 of housing 104, which wall is positioned in parallel spaced location with respect to the adjacent face 113 of the spool rim or flange 107.

Under operation, the ball 109 is normally urged radially outwardly centrifugally against the reactionary ring 110. It may be desirable to have the ball move in a plane to follow a path that may be axially to one side or to the other side of its normal median plane of operation. As in Fig. 8, the ball may be operated with a tendency to bodily rotate in a plane located to the right side of the clearance area confining the ball weight member to hold the latter out of frictional contact with the wall 112 and to hold the member in closer relation to the ends of the several magnets 108. This controlled relationship of ball travel can be brought about by tapering the internal surface 114 of the ring 110 in a desired direction to obtain the desired operation to suit the conditions that are deemed best for the most efficient and practical operation of the device. This same consideration of ball control travel in some desired plane of operation may be incorporated into any of the other forms illustrated to disclose this feature of the concept of the present design of vibrator and to enlarge upon variable aspects thereof.

While the description has been directed to the devices illustrated in the drawings that are all shown with the weight members operating in vertically disposed planes, the vibrators may be attached in any position and are not therefore, by any means limited to operation in the positions as illustrated in the drawings. It should also be understood that the vibrators need not be limited to a housing having only base flanges for attachment purposes. Other means of attachment providing rigid mounting conditions may be used with equal effectiveness for the installation of the vibrator to act upon any given object or upon other mechanisms requiring vibratory action.

Another consideration lies in the location of the magnetic means which may, without departure from the fundamental concept of this invention, be carried by either of the cooperative elements consisting of the impelling unit and/or the movable weight member that generates the off-center load forces that create or induce the vibratory action in the vibrator.

One other advantageous feature of the vibrator of this invention is the incorporation of a means to provide the axial adjustability of the propulsion spool. After considerable operation, the ball may eventually develop some wear in the annular portion of the reactionary ring and along the contact path. This will tend to increase frictional contact between the ball and ring and it will cause the ball to follow a larger diameter arc of travel, also bringing the ball path out of the preferred path of rotary operation normally coincident with the circle covering the collective axes of the several magnets.

When this situation occurs, removal of one or more washers such as 26 in Fig. 2 will displace the spool axially and cause the ball to rotate in a new plane of operation as considered in relation to the reactionary ring 5 which remains fixed as installed. Obviously, by using washers of different thicknesses or multiple washers, this range of adjustment may be considerable without renewal of operational parts.

In carrying forward this same adjustable feature, at least in all the forms of the invention except in Fig. 8, the reactionary rings can be easily withdrawn and reinserted in reverse order to bring the outer edge that normally abuts the cover into the housing cavity recess thus presenting an unused and new peripheral interior section to the ball operating areas surrounding the propulsion spool. The same washer variations are now available to select different new areas of the reversed ring as in the manner in which these adjustments were originally made before ring reversal. Obviously, renewal of any of the parts at any time can be easily made due to the simplicity of the assembly.

Referring now to Figs. 9 and 10, this vibrator as indicated at 115 in its entirety, consists essentially of a base or housing 116, a cover 117, a drive shaft 118, a rotor 119, a raceway or reactionary ring 120 and a rolling element in the form of a ball 121. The cover has suitable bosses 122 and 123 that journal shaft 118 axially of the vibrator and centrally of the chamber 124 formed in housing 116. Any suitable registering means may be employed to axially orient shaft 118 and rotor 119 relative to the base 116 as in the other forms of the invention hereinbefore described.

The rotor 119 may be fabricated from any non-magnetic material such as aluminum or a suitable dielectric plastic or resin material of adequate impact and wear resistant qualities. The rotor in Fig. 9 is preferably made from nylon and is symmetrically formed in shape, end for end, providing equal companion axial recesses 125 and 126 connected by a fluted bore 127 that matches and accommodates a reduced diameter fluted end 128 on the shaft 118. A series of washers 129 are sandwiched between shoulder 130 on shaft 118 and the bottom of recess 126, while a cap screw 131 threads into the shaft portion 128 with the screw head entirely nested within the confines of recess 125 of the rotor.

The cavity or chamber 124 is annularly recessed at 132 to accommodate ring 120 and to orient said ring in relation to the rotor 119 with the ring being so held by cover 117 as in the previously described forms of the invention.

The spool rotor 119 comprises a pair of spaced flanges or parallel faced rims 133 and 134 that are connected by a central hub 135. Each rim is bored from the axial outer surfaces thereof to form dead end cavities therein such as the group 136 and the group 137, all of which do not go through the thicknesses of the rims, but which bores terminate intermediate the thicknesses of the rims 133 and 134. In the vibrator of Fig. 9, such cavities are formed to establish or to retain thin contiguous sections 138 and 139 of the rotor material adjacent the annularly arranged guideway 140 encircling the rotor. Thus two continuous parallel radial faces 141 and 142 are provided on the rotor rims in positions oppositely flanking the rolling element or ball 121 and the operational annular path 140 of such free moving unit.

As already explained, various kinds of magnetic members may be inserted or otherwise suitably carried within the bores or cavities 136 and 137 in rims 133 and 134. The magnet members may be in the form of different solid metal or suitable composite units that function in their desired capacities. In Fig. 9, the magnets 143 and 144 are preferably ceramic type magnets that each bottom in the cavities shown. While certain types of the magnetic members may be frictionally driven into their respective bores, the magnets 143 and 144 are secured or held in place through quantities of compatible cementitious or adhesive materials such as 145 and 146 that adhere well to the nylon rotor material. Conceivably, suitable deformation of portions of the rotor 119 at or adjacent the bores 136 and 137 may also provide a means to retain the magnetic plug members.

With the Fig. 9 rotor, the entire oppositely related surface areas of the rotor rims lying adjacent the ball path present continuous uninterrupted surfaces of uniform and determinable frictional qualities. There is no possible variation in ball movement as under variable frictional conditions and no danger exists of any possible chipping or wearing of the magnetic units that are now concealed in the shielded construction depicted in Fig. 9. The magnets may be brittle in construction, and if desired, loose powdered magnetic material could also be used without danger of destruction or dispersion by a high speed ball and rotor means in a design of the kind illustrated in Fig. 9. And the intervening rotor material that is between the magnets and the ball path is transparent magnetically and offers no barrier to interfere with the operation of the device.

While Figs. 9 and 10 incorporate a ball 121 as the loosely actuable revolving element, Figs. 11 and 12 show the same vibrator as 115, but in the latter the ball 121 has been replaced with a roller 150 which is of greater volume than ball 121 and consequently of greater weight to automatically change the operative characteristics of the vibrator.

Roller 150 is made with limited parallel ends or central faces 151 and 152 to provide orientation and alignment means coacting with faces 153 and 154 of the rims 155 and 156 of rotor 157. Thus the roller remains on its true axis of rotation without canting and in true annular rolling contact with the inner cylindrical peripheral face 158 of the reactionary ring 159. Roller 150 has rounded perimeter edges at 160 and 161 to counteract any possible metal cutting, scoring or grooving under high speed revolution and the speed may be selectively varied according to conditions of operation and under given drive shaft propulsion.

The foregoing description has been directed to certain exemplary forms of the invention. Other changes in the elements of the vibratory device or in their respective combinations are contemplated without departure from the fundamental inventive concept herein disclosed. The extent of such other modification shall, however, be governed by the breadth and scope of the language in the appended claimed subject matter.

What I claim is:

1. In a vibratory device to impel an object along a predetermined path of operation to develop unbalanced forces to vibrate said device, comprising coacting units together forming a continuous guideway, a free magnetically attractable element disposed within the guideway formed by said coacting units, a structure to support and to orient said coacting units for movement relative to each other, magnetic means connected with one of said coacting guideway forming units, and drive means to actuate one of the coacting units with respect to the other unit and to set said free magnetically attractable element in motion within said continuous guideway under the influence of said magnetic means.

2. In a vibratory device having operable mechanism to impel an object along a predetermined path comprising independent separate coacting units together defining a continuous guideway therebetween, a free magnetically attractable element loosely confined within said guideway for movement therealong, mounting means to support at least one of said independent separate coacting units for motion relative to the other unit thereof, drive means connected to actuate said one unit, and magnetic means connected with said one unit and bodily movable therewith to impel said free magnetically attractable element along said continuous guideway in response to the magnetic attraction of said moving magnetic means.

3. In a vibratory device having operable mechanism to impel an object along a predetermined path comprising independent separate coacting units together providing a continuous guideway therebetween, a free element loosely disposed within said guideway formed by said independent separate coacting units for movement therealong, mounting means to support at least one of said independent units for motion relative to the other of said independent units, drive means connected to actuate said one unit, and magnetic means connected with said one unit and bodily movable therewith to impel said free element along said continuous guideway in response to the magnetic attraction of said moving magnetic means, said one unit being constructed of non-magnetic material, and said free element being constructed of magnetically attractable material.

4. A vibratory mechanism for a vibrator comprising a propulsion spool, a reactionary ring surrounding said spool, and a magnetically attractable rolling element interposed between the spool and said ring, said spool having wall portions thereon to guide said rolling element in a given plane about the interior of said ring, and magnets on said spool to magnetically attract said rolling element to actuate said element about said plane of operation within and in rolling contact with said ring.

5. In a vibratory mechanism for a vibrator comprising a rotor, shaft means to drive said rotor, a ring surrounding said rotor, a magnetically attractable movable element interposed between said rotor and ring, and magnetic means on said rotor to impel said element about said ring in a given plane of operation, said shaft means including adjustable means to axially change the position of said rotor and to shift the plane of operation of said movable element to a different plane of operational contact with said ring.

6. In a vibratory mechanism as in claim 5 wherein said rolling element normally rides in contact with said ring over a given adjustable axial area of operation located at one end portion of the breadth of said ring, and releasable means are provided to allow reversal of said ring to present a new operational axial area at the other end portion of the ring to further accommodate other adjustments by said adjustable means of said shaft means.

7. In a vibratory device, a rotor having an annular clearance area in the periphery thereof, a ring surrounding said rotor, a magnetically attractable rolling element disposed within said rotor clearance area and in contact with said ring, and magnetic means carried by said rotor to magnetically attract and actuate said rolling element about said ring, said ring having the interior surface thereof tapered in relation to the axis of said rotor whereby to control the path of operation of said rolling element to cause said element to rotate in a plane in a given relation to the annular clearance area surrounding the rotor.

8. In a vibratory device, a rotor having a hub and at least one guide rim encircling said hub, a ring surrounding said rotor, a casing to carry said ring including shaft means to drive and support said rotor, a magnetically attractable rolling element, and magnetic means carried by said rotor to magnetically attract and to actuate said rolling element about said ring, said rolling element being guided radially outwardly of said rotor hub and on one side thereof said rotor rim, and said casing being constructed with a guide wall radially positioned with respect to the rotor axis and arranged to flank the rotor hub to guide said rolling element from the other side of the element during the actuation of said element by said magnetic means.

9. In a device as in claim 8 wherein said ring has the internal surface thereof tapered relatively to the rotor axis to cause the rolling element to favor rotation in a plane of operation located to one side of the clearance area between the rolling element guiding members consisting of the rotor rim and said guide wall of said casing.

10. In a vibrator, a raceway, a free magnetically attractable weight member disposed for bodily actuation about said raceway, and a rotor to so propel said weight member including a pair of spaced structural rim elements, said elements being provided with dead end bores opening laterally outwardly of said rim elements and in locations disposed away from the path of operation of said weight member, and magnetic means carried within said bores to provide the magnetically attractive means to draw said free weight member about said raceway under rotor rotation.

11. A vibratory mechanism for a vibrator comprising a propulsion spool, a reactionary ring surrounding said spool, and a magnetically attractable rolling element interposed between the spool and said ring, said spool having wall portions thereon to guide said rolling element in a given plane about the interior of said ring, and magnets on said spool to magnetically attract said rolling element to actuate said element about said plane of operation within and in rolling contact with said ring, said propulsion spool being rotatable about a fixed axis, said magnets all being arranged at given radial distances from the spool axis, and said rolling element axis being located in coincident relation with respect to the radial locations of said magents.

12. A vibratory mechanism for a vibrator comprising a propulsion spool, a reactionary ring surrounding said spool, and a magnetically attractable rolling element interposed between the spool and said ring, said spool having wall portions thereon to guide said rolling element in a given plane about the interior of said ring, and magnets on said spool to magnetically attract said rolling element to actuate said element about said plane of operation within and in rolling contact with said ring, said magnets being arranged with their end portions terminating in exposed relation at said guide wall portions of said spool and at either side of the path of travel of said rolling element, said terminal ends of said magnets lying coplanar and flush with the spool guide wall portions to provide a continuous smooth surface on said guide wall portions to flank the path of operation of said rolling element at either side thereof.

13. An operating mechanism to generate the unbalanced load forces for the operation of a vibratory device comprising a cylindrical raceway, a loose roller disposed within said raceway for rotational movement along and in rolling contact with the inner surface of said raceway, the latter surface providing the only annular surface subjected to the rolling contact of said roller under operative conditions, and a rotor including propulsion means to actuate said roller about the raceway, said rotor having an annular channel extending thereabout, said channel having a depth to avoid contact with said roller under operative conditions while providing spaced radially disposed walls to closely flank the end portions of said roller, said roller having flat faced areas upon its opposite terminal ends for surface alignment with respect to said radial rotor walls of said channel to counteract canting of the roller on its axis to maintain said roller oriented for true rolling operation about its axis of rotation and in true rolling contact alignment upon the inner surface of the cylindrical raceway.

14. An operating mechanism for a vibrator comprising a cylindrical raceway, a loose roller adapted for rotational travel within and about said cylindrical raceway, and a rotor including propulsion means to actuate said roller, said rotor having an annular channel extending thereabout and being provided with spaced radial walls to closely flank the end portions of said roller, said roller having flat faced areas on its opposite terminal ends for surface alignment with said radial walls of the channel to counteract canting of the roller on its axis and to keep said roller oriented for true rolling operation about its axis of rotation and in true rolling contact alignment upon said cylindrical raceway, said propulsion means comprising magnetic elements carried by said spaced radial walls along the path of operation of said roller, said rotor being constructed from non-magnetic material and said roller being constructed from magnetically attractive material.

15. An operating mechanism to generate off center loads within a housing of a vibratory device comprising a casing, a fixed element and a first movable member together providing coacting guide means, a further movable member lodged within said guide means and oriented thereby for operation within said casing, supporting means carried by said casing and connected to position said fixed element and said first movable member in given operative relations within said casing, and magnetic means connected with at least one of said movable members to magnetically attract the other of said movable members to induce concerted motion between the aforesaid movable members about their respective paths of operation within said casing.

16. In a vibratory device, walled means, a movable element cooperating with said walled means to form a guideway, a further movable element disposed within said guideway and having portions thereof arranged to follow the contour of said guideway, and magnetic means connected with one of said movable elements for bodily actuation thereby, said magnetic means providing magnetically attractive means to coact with the other of said elements to set the other element in motion along said guideway under the influence of magnetic attraction.

References Cited in the file of this patent

UNITED STATES PATENTS

| | | |
|---|---|---|
| 268,236 | Hubbard | Nov. 28, 1882 |
| 1,719,122 | Mitchell | July 2, 1929 |
| 2,127,317 | Welch | Aug. 16, 1938 |
| 2,175,321 | Saffir | Oct. 10, 1939 |
| 2,720,434 | Trbojevich | Oct. 11, 1955 |
| 2,829,527 | Fleming | Apr. 8, 1958 |

FOREIGN PATENTS

| | | |
|---|---|---|
| 81,618 | Norway | Apr. 13, 1953 |